United States Patent Office 3,523,112
Patented Aug. 4, 1970

3,523,112
METHOD OF PURIFYING HYDROCARBON
STREAM PRIOR TO POLYMERIZATION
Marlyn J. Brock, Akron, Ohio, assignor to The Firestone Tire & Rubber Company, Akron, Ohio, a corporation of Ohio
Filed Jan. 16, 1968, Ser. No. 698,257
Int. Cl. C08d 3/06, 3/10; C08f 3/16
U.S. Cl. 260—94.2
13 Claims

ABSTRACT OF THE DISCLOSURE

Polymerization reactions involving lithium catalysts tend to be quite sensitive to catalyst concentration. Even slight variations in catalyst concentration can significantly alter the nature of the final product obtained. In the polymerization of diolefins, both oxygen-containing impurities and acetylenic impurities in the monomer stream tend to tie up a significant amount of the catalyst in catalytically inactive lithium compounds. To maintain any given concentration of active catalyst, it is critical to compensate for such impurities.

Figure 1:
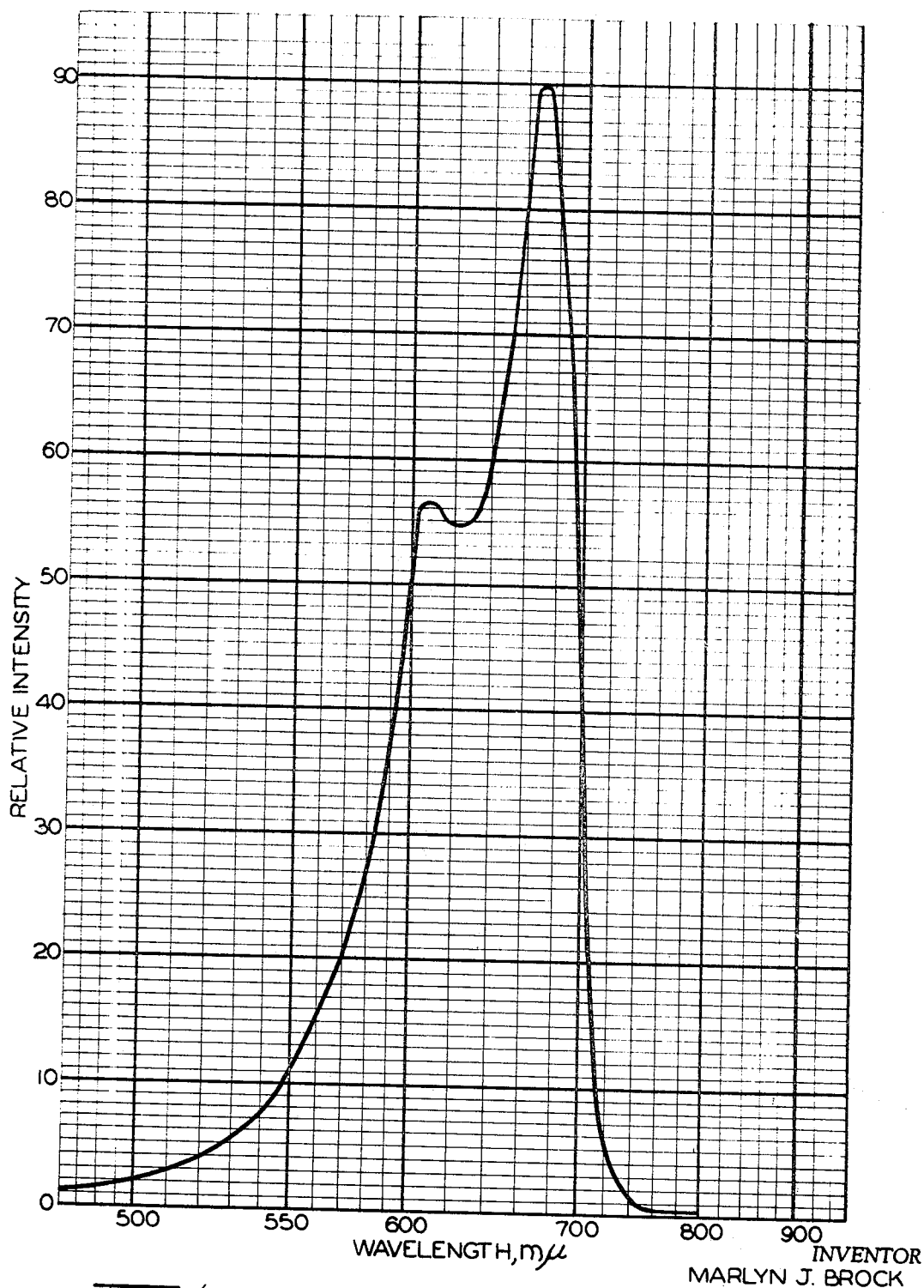

If the impurities are reacted with excess lithium catalysts, e.g. butyl lithium and the resulting mixture reacted with certain dye intermediates, e.g., Michler's ketone, dye precursors are obtained which can be hydrolyzed and oxidized to diphenyl methane type dyes having a quinoid structure. The intensities of these dyes are proportional to the acetylenic impurity concentration and the free alkyl lithium catalyst concentration, and may be correlated therewith and/or converted to a signal which will control the supply of catalyst to the polymerization system. A fluctuating impurity level can be continuously compensated for to provide a continuously operable process for polymerization of diolefins with carefully controlled molecular weight.

---

This invention relates to the control of polymerization reactions. More particularly, the invention relates to an improved process for controlling the polymerization of diene monomers to obtain polymers of improved and uniform properties.

There are a number of processes for the preparation of rubbery polymers utilizing a conjugated diolefin monomer. Synthetic rubbery polymers prepared by the polymerization of butadiene or isoprene alone or in admixture with each other or with styrene or other monoolefin have been developed with properties equal to or superior to those obtained from natural rubber.

The stereospecific structure of these polymers on which their physical properties are critically dependent is determined by the choice of catalyst system used in their polymerization. A catalyst system capable of producing such desired polymeric products are the lithium-based catalysts such as those taught in British Pats. 813,198; 814,676; 817,693; 817,695 and 972,258. While such polymers can be made by other catalyst systems, the polymers produced by the lithium-based system have properties equal to or superior to those produced by such other catalyst systems. Accordingly, lithium catalysts are in wide commercial use in the production of stereospecific rubbery polymers.

A characteristic of the lithium-based polymerization is that the amount of catalyst determines not only the rate of the polymerization, but also the molecular weight of the polymers produced and, hence, many of the physical properties of the resulting polymer. To obtain the desired rate of reaction and to obtain polymeric products having the desired physical properties, it is essential to know precisely the level of the catalyst concentration available for the polymerization reaction. The lithium-based catalysts are extremely sensitive and efficient polymerization promoters, being effective at concentrations measured in thousandths of a percent, i.e., in parts per million of monomer.

The lithium-based catalysts are highly sensitive to certain impurities commonly present in monomer streams. In particular, it has been found that these catalysts will react with the alpha-acetylene compounds present in the monomer streams to form reaction products having little or no catalytic activity. Thus, even though polymerization-grade monomers are highly purified chemicals with impurity concentrations reduced to the order of parts per million, the impurities can still cause a significant problem. The high sensitivity of the lithium-based catalysts, coupled with their reactivity towards these impurities, can greatly reduce the effective amount of lithium-based catalyst in the polymerization system. With a monomer stream of extremely high purity, 40 parts of carbon-bound lithium per million parts of butadiene can produce a polymer having an inherent viscosity of about 2 (representing a polymer of commercially desirable molecular weight). The presence in the system of as little as 50 parts per million of alpha-acetylenes would lower the amount of available lithium from 40 to 34 parts, producing a polymer of increased inherent viscosity (about 15% to 20% higher), having significantly different molecular weight and requiring a substantially longer reaction time to complete the polymerization.

If the impurity levels of commercially available monomer streams were constant and/or predictable, the catalyst dosage could be adjusted to compensate for the impurities. Unfortunately, while the impurity levels are low, there is considerable variation in the levels from one supplier to the next and from one batch to the next. Variations in alpha-acetylene content have been found to range from 50 to 300 parts per million in commercially available polymerization-grade butadiene.

Analysis of the monomer streams is extremely difficult, even on a laboratory basis the quantitative techniques are inadequate for accurately determining the impurity level at such low concentrations. On a production control basis, these techniques are completely impractical. Similarly, removal of such trace amounts in such fluctuating concentrations is not commercially feasible. Nevertheless, it is essential to obtain reproducible reaction conditions to insure the production of polymers of consistent, desirable characteristics.

A process for continuously monitoring the impurity level of diene monomer streams has been developed based on the following reactions:

(1) impurities such as moisture, air, and carbonyl compounds react almost instantaneously with alkyl lithium compounds;
(2) alpha-acetylenes react readily with alkyl lithium compounds but reaction (1) proceeds preferentially;
(3) the products of reaction (2) can be reacted with members of a particular class of dye intermediates to provide a dye having a distinctive absorption wavelength;
(4) alkyl lithium compounds can be reacted with the same dye intermediates as in (3) to provide a different dye having a different distinctive absorption wavelength;
(5) the reaction products of reaction (1) do not form a dye with the dye intermediates of reactions (3) and (4).

Dye intermediates suitable for the purposes of the present invention can be defined by the formula

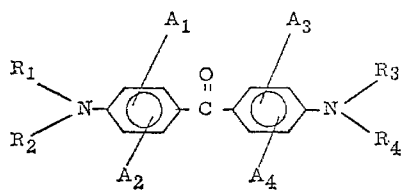

wherein each of $R_1$ through $R_4$ is separately selected from the group consisting of hydrogen and alkyl groups of from 1 to 5 carbon atoms, and wherein each of $A_1$ through $A_4$ is separately selected from the group consisting of hydrogen, alkyl groups of from 1 to 5 carbon atoms, halogen and nitro groups. In general, the preferred dye intermediates are those in which $R_1$ through $R_4$ and $A_1$ through $A_4$ are hydrogen and/or alkyl, particularly where $R_1$ through $R_4$ are alkyl and $A_1$ through $A_4$ are hydrogen. The particularly effective and useful dye intermediate is Michler's ketone in which $R_1$ through $R_4$ are all methyl and $A_1$ through $A_4$ are all hydrogen. The reactions and the invention will be illustrated with this preferred ketone. However, it is to be understood that the invention can be practiced with other aromatic ketones of the class defined above.

Before discussing in detail the techniques for practicing the present invention, it is advantageous to consider the probable course of the reactions when a diene monomer stream is dosed with an alkyl lithium catalyst and when an aromatic ketone is added to the system.

The first reaction that occurs when alkyl lithium compound is added to the monomer stream involves moisture, air, carbonyl, etc., as discussed above. Excess alkyl lithium compound over that utilized in reaction with the oxy-impurities reacts with alpha-acetylene compounds according to the equation $$R'—C \equiv CH + R''Li \rightarrow R'—C \equiv C—Li + R''H \quad (1)$$

wherein R'— is any of the groups commonly associated with the alpha-acetylene impurities and R''—is an alkyl group. Excess alkyl lithium over that required for reaction with the impurities will be referred to hereinafter as "free alkyl lithium." Whether in fact it is completely "free" or is associated or reacted at this stage with the diene monomer is unimportant for an understanding of the invention; the significant fact is that the free alkyl lithium in the system not only does not interfere with the determination of the impurity level in the monomer stream, but assists by serving as an end-point indicator.

In the following reactions illustrating dye formation, R—Li represents both the reaction product of reaction I and the free alkyl lithium compound, both of which react in a similar manner with the dye intermediates such as Michler's ketone.

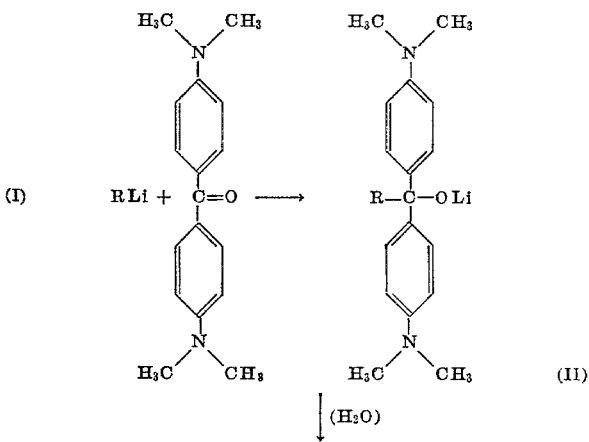

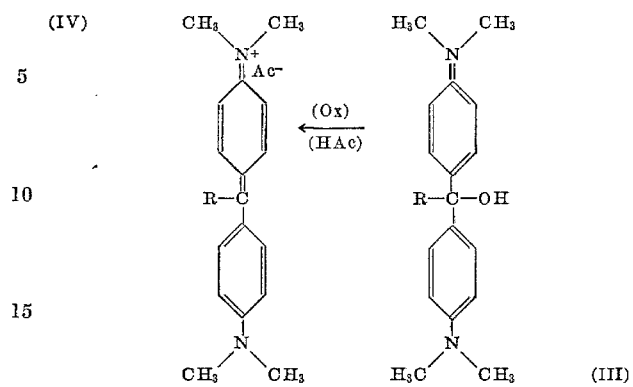

Upon addition of Michler's ketone to the monomer system the ketone reacts with both the acetlyenic lithium compound (reaction I) and the free alkyl lithium compound in accordance with reaction II. The resulting products are then hydrolyzed by the addition of water to the system to produce dye precursors according to reaction III. The dye precursors are then oxidized in the presence of acid in accordance with reaction IV, e.g., by the addition of iodine in glacial acetic acid, to dyes exhibiting the quinoid structure. The dye structure is identical whether formed from the acetylenic lithium compound or from the free alkyl lithium compound except for the R group. However, the dye containing the acetylenic R group with its triple bond has a distinctly different absorption wavelength from the dye produced from the free alkyl lithium compound.

Thus, for example, utilizing butyl lithium as the alkyl lithium compound, the dye produced with the acetylenic impurities normally associated with butadiene and/or isoprene exhibits a characteristic absorption maximum at a wavelength of 670 m$\mu$. The dye produced with the free butyl lithium compound exhibits a characteristic absorption maximum at a wavelength of 605 m$\mu$. Since reaction I between the alpha-acetylene compounds and the butyl lithium is essentially quantitative, where the catalyst level is too low to completely remove all the alpha-acetlyene compounds, the color observed is green and only the 670 m$\mu$ maximum is observed. At higher catalyst levels in which there is substantial free butyl lithium compound, the color of the solution is blue and both absorption maxima are observed.

In a particular application of the present invention a butadiene monomer stream diluted, for example, to 20 to 30% concentration with hexane can be evaluated for its impurity content. A suitable sized sample of the mixture, e.g., 200 ml., is charged to a suitable sample bottle in a manner to prevent contamination by air, moisture, etc. A measured amount of a lithium catalyst diluted in a suitable hydrocarbon, e.g., butyl lithium dissolved in hexane or pentane, at a concentration of the order of 0.005 gram of butyl lithium per ml. is added to the sample. There is no criticality to the particular concentration of the butyl lithium reagent or the amount added to the sample, provided that the total amount of active lithium catalyst added is sufficient to indicate the end point of the acetylenic impurity—butyl lithium reaction; this will be discussed in greater detail subsequently. At a fixed period of time after addition of the catalyst, e.g., one minute, a suitable quantity of Michler's ketone, e.g., 5 ml. of a 1% solution of the ketone in benzene, is added to the sample. A suitable amount of water is then added to effect hydrolysis of the ketone-lithium compound reaction products, e.g., 10 ml. The water addition is followed by the addition of an acidic oxidizing agent, e.g., 5 mil. of 0.2% iodine in glacial acetic acid. After a set period of time, e.g., 20 minutes, a portion of the aqueous phase is examined for its light absorption characteristics with a spectrophotometer.

The pertinent portion of a typical absorption curve obtained by the above-described technique is shown in FIG. 1. As will be noted, there is a maximum or peak at a wavelength of about 670 m$\mu$ which is the dye resulting from the interaction between the acetylenic impurities, the butyl lithium catalyst and Michler's ketone. A very slight peak or maximum is observed at a wavelength of about 605 m$\mu$ due to the dye formed by the interaction of a slight excess of the butyl lithium catalyst with Michler's ketone. The impurity level can now be determined in terms of parts by weight of butyl lithium catalyst per hundred parts by weight of butadiene monomer (or in terms of parts by weight of carbon-bound lithium or any other suitable expression by way of appropriate gravimetric factors); thus for the chart of FIG. 1, it is known that the amount of catalyst added for the known amount of butadiene monomer was sufficient to just provide a very slight excess of butyl lithium over that required to react with the impurities. If a greater amount of butyl lithium had been introduced into the sample, the peak at 605 m$\mu$ would have been considerably higher. If insufficient butyl lithium had been provided to give a slight excess, no peak would have been observed at 605 m$\mu$. It is to be noted that while the peak at 670 m$\mu$ is indicative of the acetylenic impurities, the amount of butyl lithium added to just give a slight excess is indicative of total impurity, both acetylenic and the non-dye forming oxy-impurities. As noted previously, the latter react with the butyl lithium prior to the acetylenic impurity reaction; thus the acetylenic peak at 670 m$\mu$ is indicative of the completion of the reaction of the oxy-impurities as well as of the presence of acetylenic impurities.

In applying the above information to the butadiene polymerization, the amount of catalyst per hundred parts by weight of monomer required to react with the impurities is added to the amount of catalyst per hundred parts by weight of monomer required to give a polymer of desired inherent viscosity (and accordingly, of desired molecular weight) assuming the monomer to be of 100% purity. By continually monitoring the monomer stream in this manner, it is possible to vary the catalyst dosage according to the impurity level in the monomer stream and thereby insure close control of polymer molecular weight despite fluctuations in the impurity level of the monomer stream.

In practicing the present invention, the hydrolysis and oxidation may be carried out successively or concurrently. The oxidation is carried out at a slightly acidic pH. Any oxidizing agent which does not interfere with detection of the dye characteristics may be used. Thus $I_2$ may be used even though it is highly colored as any excess adds to the double bonds of the monomer to form a colorless product. Other oxidizing agents include mercuric acetate, dissolved oxygen, etc. The slightly acidic pH is suitably provided by a water-soluble weak acid such as acetic acid.

Figure 2:
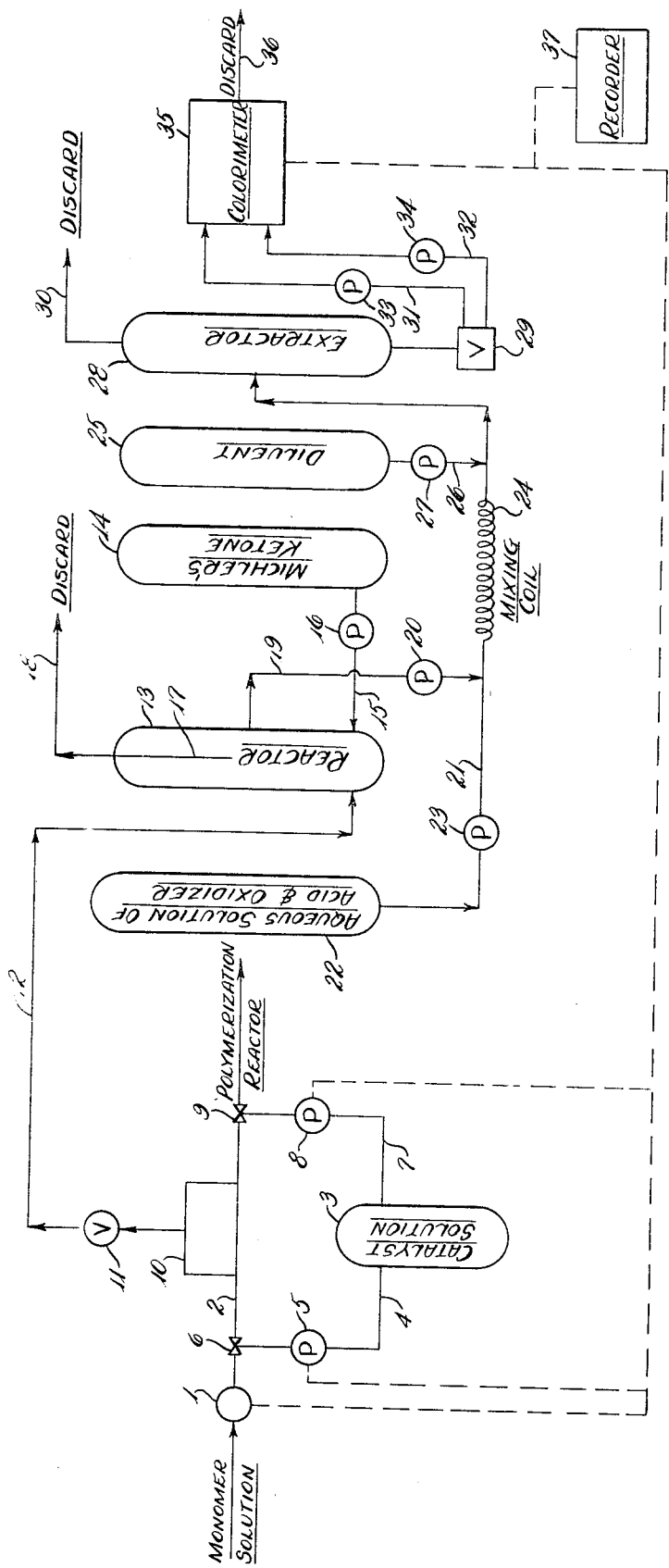

The invention is of primary utility in the continuous monitoring of a monomer feed stream and the automatic control of the catalyst feed to the monomer stream. This method will be better understood by reference to FIG. 2 which is a flow diagram illustrating a preferred embodiment of the invention. The embodiment shown illustrates only the control portion of the polymerization process. The actual polymerization process itself may be either continuous or batch at the choice of the operator. As shown in the drawing, the monomer solution (in this case 25% butadiene in hexane) passes to the polymerization reactor through line 2. A metered amount of catalyst solution, in this case butyl lithium dissolved in hexane, is added to the monomer solution from reservoir 3 through line 4 and proportioning pump 5 by means of mixing valve 6. A portion of the monomer solution-catalyst mixture passes through bypass line 10 and is withdrawn through take-off line 12. The monomer solution in line 2 is maintained at a pressure of about 50 p.s.i.g., and reducing valve 11 reduces the pressure of the solution in line 12 to about 10 p.s.i.g., this pressure being sufficient to maintain adequate flow through the line. The mixture is introduced into reactor 13, and a metered amount of Michler's ketone added to reactor 13 from reservoir 14 by means of line 15 and proportioning pump 16. In the reactor 13 diptube 17, leading to the discard line 18 adjusts the holdup time of the mixture of Michler's ketone solution-monomer catalyst solution. A metered amount of the reaction product is taken out of the reactor 13 through line 19 by proportioning pump 20 and introduced into line 21. A metered amount of acidic oxidizer solution from a supply reservoir 22 is also introduced into line 21 by proportioning pump 23. In this case the acidic oxidizer solution was 50% acetic acid, 0.2% iodine and the balance water. These solutions are mixed in mixing coil 24 wherein hydrolysis and oxidation are carried out concurrently forming the diphenylmethane dyes as indicated and then a metered amount of a diluent (in this case 50% acetic acid in water) is added from reservoir 25 through line 26 and proportioning pump 27. The mixture is then introduced into extractor 28 where the aqueous layer is removed through valve 29 and the remainder passed to discard through discard line 30. The aqueous dye solution is then introduced through lines 31 and 32 by means of proportioning pumps 33 and 34 to colorimeter 35 where the intensities of the two absorption maxima, namely 605 m$\mu$ and 670 m$\mu$ are determined and then the solutions passed to discard through line 36.

In place of colorimeter 35, a scanning spectrophotometer may be advantageously employed. Depending on the nature of the particular detecting instrument employed, it may be unnecessary to have a plurality of lines and pumps (items 31 through 34); a single line and pump may suffice.

The colorimeter 35 (or spectrophotometer) is operably connected to recorder 37. Recorder 37 is a recorder-controller of a type well known in the art which both records a visual indication of the colorimeter data and is adapted to transmit a signal such as an electronic or pneumatic signal to a flow control means such as a motor valve (or a proportioning pump) which is thereby actuated to maintain a desired flow of material. In this case a signal generated by the recorder 37 controls the monomer solution stream of motor valve 1 and porportioning pumps 5 and 8 so that these variables may be adjusted in accordance with the catalyst concentrations determined from the sample withdrawn through line 12. Thus, if too low a catalyst concentration is present as a result of the initial catalyst addition through line 4, the signal from recorder 37 would actuate proportioning pump 8 to provide an additional increment of catalyst from catalyst reservoir 3 through line 7 to the monomer solution in line 2 by means of mixing valve 9. On the other hand, if the catalyst level were too high, recorder 37 would then either reduce the amount of catalyst solution being added by means of proportioning pump 5 or increase the rate of flow of monomer solution by controlling motor valve 1 or both.

Alternatively, the signal from the recorder 37 may be inactivated and the controls for the proportioning pumps 5 and 8 and for motor valve 1 may be adjusted manually by an operator in response to the values visibly recorded by recorder 37. Similarly, the visual recordation may be omitted and reliance placed only on the automatic controls.

In this manner the polymerization of the butadiene can be controlled very precisely to obtain a polymer of a given molecular weight in the useful range.

The example procedure was repeated substituting isoprene for butadiene. Despite the very narrow range of useful molecular weights, the polymerization of isoprene using butyl lithium catalyst was controlled very precisely to obtain the desired products.

There are a number of modifications of the above-described techniques which can be employed in practicing the present invention. Thus, for example, a constant feed of catalyst may be supplied to the monomer stream with a separate feed of catalyst fed to the monomer stream through a proportioning pump controlled by the impurity level of the monomer stream. In this instance, it would be the impurity level alone that would need to be monitored. In another modification the catalyst is added to the system prior to sampling in an amount known to exceed substantially the impurity level and by monitoring the free catalyst concentration control the extent of the excess added. Other modifications will be apparent to those skilled in the art.

As has been previously indicated, the height of the peaks on charts such as that on FIG. 1 is proportional to the concentration of the dye responsible for the peak at the particular wavelength monitored. By appropriate calibration and testing of the recording devices with known samples, it is possible to obtain a direct reading of acetylenic impurities and/or free catalyst directly from the chart. In these instances, the control devices can be caused to read on differential measurements such as the differences between the peak at 605m$\mu$ and the peak at 670 m$\mu$ or the differences between the peaks and the minimum point between the peaks. Where it is desired to determine the total oxy-impurity level, it is possible to measure the difference between the amount of catalyst required to give a slight excess of free catalyst and the amount of catalyst corresponding to the acetylenic impurity level as measured, for example, by the acetylenic peak height. Alternatively, it is possible to monitor the peak height of the free catalyst and the peak height for acetylenic impurities and subtract the sum of these from the total catalyst feed to determie the absolute quantity of oxy-impurities.

The present technique may be varied to increase its sensitivity according to the impurity level of the monomer stream. For a monomer stream that is high in acetylenic impurities, it is preferable to practice the process in the manner described above in which catalyst is added to the system at any of the various stages to provide the acetylenic dye peak and at least the initial indication of a catalyst dye peak and preferably a double peak. However, where the acetylenic impurities are low, as relative to the amount of lithium catalyst employed in the system, monitoring of the system may be extremely difficult. Thus, the small acetylenic impurity dyepeak may be obscured by the very much greater peak of the catalyst dye. Similarly, a small peak may give rise to the possibility of the greater likelihood of error in measurement. Under these circumstances, it has been found advantageous to supply to the monomer stream the anticipated amount of catalyst such as butyl lithium compound, but when treating the sample to add an excess of a known acetylenic compound. The excess here referred to is that which is sufficient to react with all of the catalyst in the system. Under these circumstances, only a single acetylenic peak will be obtained. However, the catalyst-containing monomer stream is also separately monitored for the catalyst concentration, e.g., for the butyl lithium content. The acetylene impurity level can then be determined as the different between the acetylenic peak and the butyl lithium peak.

In conducting the above technique for low acetylenic impurities, the acetylenic compounds added should correspond to the acetylenic impurities present in the monomer stream if meaningful significance is to be attached to the above method of calculation of the impurity level of the monomer stream. In general, the acetylenic impurities providing a peak intensity at a wavelength of 670 m$\mu$ appear to be mainly propyne-1 and butyne-1. Of course, it is possible to calibrate the recording devices and process controls to the dyes formed by any acetylenic compound which may be present in the monomer stream by merely testing out the reaction with a known sample of the acetylenic compound.

In still another variation of the subject invention the free alkyl lithium compound in the monomer stream can be reacted prior to treatment of the sample with Michler's ketone or the like with a known active hydrogen compound such as acetylene or a substituted acetylene to form a new lithium compound. The reaction will, of course, be similar to that of reaction I above. In this instance, however, instead of obtaining a dye peak at 605 m$\mu$ wavelength as might be expected with a butyl lithium compound, the major peak will occur at about 670 m$\mu$ and a minor peak will be observed according to the type of acetylenic compound added. Thus, for example, by the addition of phenyl acetylene, the minor peak will occur at a wavelength of about 485 m$\mu$; vinyl acetylene would have a minor peak at about 465 m$\mu$; an acetylenic compound in which the balance of the attached groups are saturated would exhibit a peak at about 445 m$\mu$; a vinyl phenyl acetylene would give a peak at about 495 m$\mu$. All the acetylenes mentioned above exhibit a major peak in the 660 to 680 m$\mu$ region. Of course, in each instance it would be necessary to check out the system with the specific lithium catalyst being employed and to determine the effect of the subsequent acetylene addition, if any, on the peak representing the dye formed from the acetylenic impurity in the monomer stream. Again, however, these are merely routine tests which can be determined with samples of known composition and concentration. The absorption characteristics mentioned above are useful in identifying unknown acetylenes which may occur in the polymerization stream. The butyllithium dye does not exhibit a minor absorption maximum.

In the foregoing discussion, for manual bottle analysis, it was suggested that an alkyl lithium compound be employed in the dye forming reaction irrespective of the particular lithium catalyst to be employed in the polymerization reaction. While this is the preferred practice of the invention, the invention is not so limited. Thus, any of the lithium catalysts known to the art, particularly as indicated in the above-identified patents which are capable of undergoing reactions similar to reactions I through III above, can be utilized in the present invention. Thus, it is not essential, albeit it may be desirable, that the lithium compound be restricted to those in which the carbons are alkyl or aliphatic in nature. Thus, phenyl lithium may be employed in place of butyl lithium. In this instance, the dye formed with the free lithium compound and Michler's ketone will be the well known Malachite green. Other of the active lithium compounds of this type can be similarly substituted for the alkyl lithium compounds in the invention as described above.

As will be seen from the above description of the invention, this process permits detecting acetylenic impurities in the parts per mlilion range as well as accurately determining the amount of catalyst required to react with water, air and carbonyl compounds. Further, the process is highly flexible and may be adapted equally to laboratory use as well as to continuous or semicontinuous control of the polymerization process.

While the process of the invention is particularly applicable to monitoring a diolefin stream, the invention is not limited thereto. Thus, the process is useful as a general analytical process for the determination of the alpha-acetylenic content of hydrocarbons or other materials so long as no compounds are present which interfere with the detection of the characteristic absorption band of the diphenylmethane dyes as described herein.

The following summary of particularly useful dye intermediates is in lieu of examples; since the polymerization reactions in the polymer-forming process itself are well known in the art and since the procedures used with the above dye intermediates are essentially the same as those described previously, no further details of the examples will be presented herein. In the table which follows, the various R and A designations are the same as those provided earlier herein with regard to the structural formula of the useful dye intermediates.

TABLE OF USEFUL DYE INTERMEDIATES

| $R_1, R_2$ | $R_3, R_4$ | $A_1, A_2$ | $A_3, A_4$ |
|---|---|---|---|
| both methyl | both methyl | both hydrogen | both hydrogen |
| both pentyl | both pentyl | both hydrogen | both hydrogen |
| both methyl | both hydrogen | both hydrogen | both hydrogen |
| both butyl | both ethyl | one hydrogen, one chlorine | one hydrogen, one methyl |
| both methyl | both methyl | both methyl | both methyl |
| both methyl | both methyl | one hydrogen, one nitro | one hydrogen, one nitro |

With each of the foregoing, the catalysts specifically identified in British Pats. 813,198; 814,676; 817,693; 817,695 and 972,258, the disclosures of which are hereby incorporated by reference, can be be employed successfully. Further, the specific organo lithium compound catalysts identified in U.S. Pat. 3,030,346 are hereby incorporated by reference as examples of useful lithium catalysts for the purposes of the present invention. Each of these catalysts is particularly useful with the dye intermediates identified in the above table.

As noted above, the techniques for carrying out the various reactions and the details of the control apparatus used for the practice of the present invention are not novel per se. It will be found in the art. In addition to the above-identified patents, specific reference is made to U.S. Pats. 2,968,308; 3,065,218; 3,074,919; 3,074,920 and 3,078,265 for examples of polymerization control apparatus and techniques.

There are obviously many modifications of the present invention which may be made within the skill of the art. The above examples are not intended to exclude such modifications and the examples are to be understood as merely illustrating operable practices for the purposes of the present invention.

What is claimed is:

1. In the polymerization of a conjugated diene wherein a hydrocarbon stream comprising said diene is dosed with a catalyst and passed to a reaction zone for the polymerization reaction, the improvement which comprises continuously compensating for catalyst-consuming impurities in said hydrocarbon stream by
    (a) first adding to at least a portion of said stream a measured quantity of an active hydrocarbonaceous lithium diene polymerization catalyst in an amount at least sufficient to react with all of the catalyst-consuming impurities including alpha-acetylenes present in said hydrocarbon stream to form an adduct thereof,
    (b) thereafter adding to the mixture from step (a) a dye intermediate in a quantity at least sufficient to react with all of the acetylenic adducts formed in step (a) to form a dye precursor, said dye intermediate being defined by the formula

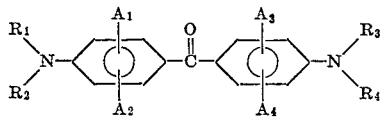

wherein each of $R_1$ through $R_4$ is separately selected from the group consisting of hydrogen and alkyl groups of from 1 to 5 carbon atoms, and wherein each of $A_1$ through $A_4$ is separately selected from the group consisting of hydrogen, alkyl groups of from 1 to 5 carbon atoms, halogen and nitro groups,
    (c) thereafter hydrolyzing by means of water and oxidizing at a slightly acidic pH by means of an oxidizing agent selected from the group consisting of iodine, mercuric acetate and dissolved oxygen the dye precursors from step (b) to dyes containing a quinoid structure,
    (d) thereafter measuring the light intensity at a wavelength corresponding to an absorption maximum which is characteristic of a dye produced in step (c),
    (e) thereafter converting said measurement to a signal proportionate to the catalyst-consuming impurities,
    (f) thereafter transmitting said signal to, and thereby actuating flow control means to adjust the relative proportions of active polymerized catalyst and monomer to a desired level, and
    (g) repeating said steps in a generally continuous manner to maintain said relative proportions at said desired level throughout the course of said polymerization.

2. A method in accordance with claim 1 wherein the hydrocarbon mixture comprises 1,3-butadiene.

3. A method in accordance with claim 2 wherein the lithium catalyst is alkyl lithium.

4. A method in accordance with claim 2 wherein the catalyst is butyl lithium and wherein the dye intermediate is Michler's ketone.

5. A method in accordance with claim 1 wherein the hydrocarbon mixture comprises isoprene.

6. A method in accordance with claim 5 wherein the lithium catalyst is alkyl lithium.

7. A method in accordance with claim 6 wherein the dye intermediate is Michler's ketone.

8. A method in accordance with claim 5 wherein the catalyst is butyl lithium and wherein the dye intermediate is Michler's ketone.

9. In the polymerization of a conjugated diene wherein a hydrocarbon stream comprising said diene is dosed with a catalyst and passed to a reaction zone for the polymerization reaction, said hydrocarbon stream containing a small but significant quantity of acetylenic impurities, the improvement which comprises
    (a) adding to said hydrocarbon stream a measured quantity of an active hydrocarbonaceous lithium diene polymerization catalyst in an amount substantially in excess of the amount required to react with all of the catalyst-consuming impurities including alphaacetylenes present in said hydrocarbon stream to form an adduct thereof and approximating the amount required for the polymerization of the monomer in said stream to a desired value of molecular weight,
    (b) thereafter introducing into a sample of the stream from step (a) a measured quantity of a hydrocarbonaceous acetylenic compound in an amount at least sufficient to react with all of the lithium catalyst from step (a) which is in excess of that required to react with the impurities in the monomer stream,
    (c) thereafter adding to the mixture from step (b) a dye intermediate in a quantity at least sufficient to react with all of the acetylenic adducts formed as the result of steps (a) and (b) to form dye precursors, said dye intermediate being defined by the formula

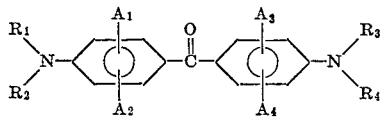

wherein each of $R_1$ through $R_4$ is separately selected from the group consisting of hydrogen and alkyl groups of from 1 to 5 carbon atoms, and wherein each of $A_1$ through $A_4$ is separately selected from the group consisting of hydrogen, alkyl groups of from 1 to 5 carbon atoms, halogen and nitro groups, (d) thereafter hydrolyzing by means of water and oxidizing at a slightly acidic pH by means of an oxidizing agent selected from the group consisting of iodine, mercuric acetate and dissolved oxygen the dye precursors from step (c) to dyes containing a quinoid structure, (e) thereafter measuring the light intensity at a wavelength corresponding to an absorption maximum which is characteristic of a dye produced in step (d), (f) thereafter converting said measurement to a signal proportionate to the catalyst-consuming impurities, (g) thereafter transmitting said signal to, and thereby actuating flow control means to adjust the relative proportions of active polymerized catalyst and diene to a desired level, and (h) repeating said steps in a generally continuous manner to maintain said relative proportions at said desired level throughout the course of said polymerization.

10. A method in accordance with claim 9 wherein the hydrocarbon mixture comprises isoprene and wherein the lithium catalyst is alkyl lithium.

11. A method in accordance with claim 10 wherein the dye intermediate is Michler's ketone.

12. A method in accordance with claim 11 wherein the lithium catalyst is butyl lithium.

13. A method according to claim 5 wherein the dye intermediate is Michler's ketone, the catalyst is butyl lithium, and the oxidizing agent is iodine.

References Cited

UNITED STATES PATENTS 3,290,116  12/1966  Carroll _____ 260—94.2 XR

JOSEPH L. SCHOFER, Primary Examiner

W. F. HAMROCK, Assistant Examiner

U.S. Cl. X.R.

260—95, 94.9, 681.5